(12) United States Patent
Pfeiffer

(10) Patent No.: US 6,877,215 B2
(45) Date of Patent: Apr. 12, 2005

(54) COMPLIANCE MECHANISM FOR MANIPULATING A CONTROL OBJECT

(75) Inventor: Michael W. Pfeiffer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 396 days.

(21) Appl. No.: 10/032,176

(22) Filed: Dec. 21, 2001

(65) Prior Publication Data

US 2003/0070193 A1 Apr. 10, 2003

Related U.S. Application Data

(60) Provisional application No. 60/316,065, filed on Aug. 30, 2001.

(51) Int. Cl.$^7$ .......................... B23P 19/00; H01R 19/00
(52) U.S. Cl. .................. 29/729; 29/603.03; 29/603.04; 29/742; 29/759; 29/760; 294/2; 294/64.1; 414/737; 414/752; 901/16; 901/27; 901/31
(58) Field of Search ......................... 29/603.03, 603.04, 29/729, 742, 759, 760; 901/16, 27, 31; 294/2, 64.1; 414/732, 752

(56) References Cited

U.S. PATENT DOCUMENTS

| | | | |
|---|---|---|---|
| 4,332,066 A | | 6/1982 | Hailey et al. |
| 4,400,885 A | | 8/1983 | Consales |
| 4,409,736 A | | 10/1983 | Seltzer |
| 4,486,928 A | * | 12/1984 | Tucker et al. ............... 29/26 A |
| 4,553,892 A | * | 11/1985 | Huffman et al. ............ 414/797 |
| 4,595,334 A | | 6/1986 | Sharon |
| 4,723,353 A | * | 2/1988 | Monforte ..................... 483/10 |
| 4,789,292 A | | 12/1988 | Holcomb | 
| 4,910,859 A | | 3/1990 | Holcomb |
| 5,116,190 A | | 5/1992 | Silke |
| 5,419,674 A | | 5/1995 | Chang |
| 5,879,277 A | * | 3/1999 | Dettman et al. ............. 483/13 |
| 5,960,208 A | * | 9/1999 | Obata et al. ................ 713/330 |
| 6,304,411 B1 | * | 10/2001 | Elsing et al. ............ 360/97.01 |

FOREIGN PATENT DOCUMENTS

JP           11016237 A    *   1/1999    ......... G11B/17/038

OTHER PUBLICATIONS

"Computer simulation of compliant motion control for a robotic arm"; Munday, E.G.; System Theory, 1989. Proceedings., Twenty-First Southeastern Symposium on , Mar. 26-28, 1989 pp.: 98-103.*

* cited by examiner

Primary Examiner—Paul D Kim
(74) Attorney, Agent, or Firm—Fellers, Snider, et al.

(57) ABSTRACT

A compliance mechanism for manipulating a control object by an end effector supported by a robotic arm. The robotic arm is supported by a combination of linear slides for two-axis freedom of movement. A locking arm is attached to the robotic arm and the locking arm is moveable between a locked and an unlocked position. The locking arm is biased in the locked position to restrict movement of the robotic arm along the two axes. A plunger extends adjacent the end effector. Upon engagement with an alignment feature associated with the control object, the plunger moves the locking arm from the locked to the unlocked position, thereby introducing compliance along the two axes manipulation of the control object.

20 Claims, 7 Drawing Sheets

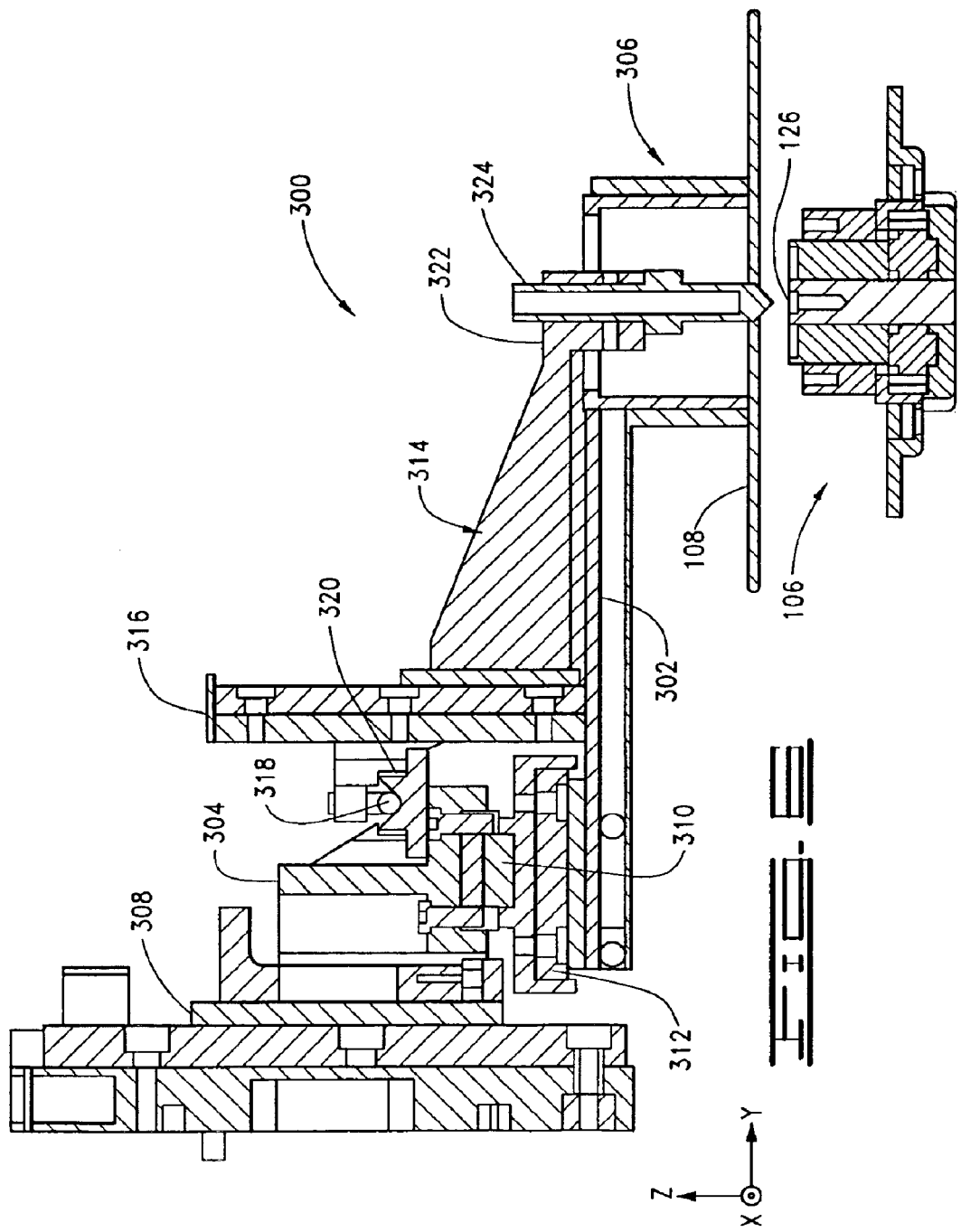

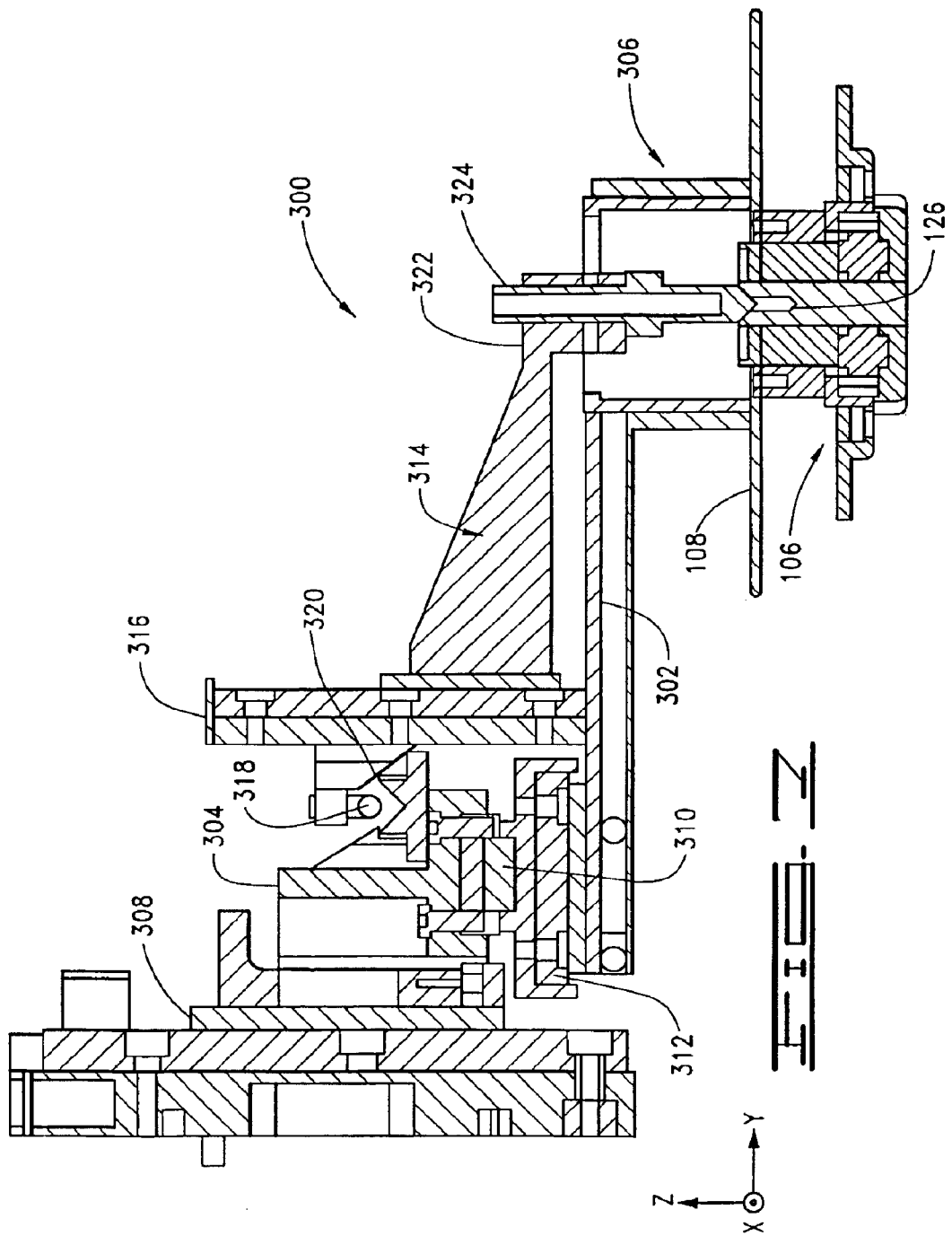

COMPLIANCE MECHANISM FOR MANIPULATING A CONTROL OBJECT

RELATED APPLICATIONS

This application claims priority to U.S. Provisional Application No. 60/316,065 filed Aug. 30, 2001.

FIELD OF THE INVENTION

The claimed invention relates generally to the field of automated assembly equipment and more particularly, but without limitation, to a compliance mechanism used for manipulating a control object, such as a disc/spacer stack relative to a spindle motor hub.

BACKGROUND OF THE INVENTION

A compliance mechanism is an assembly device that compliantly manipulates an object, such as a first component with respect to a second component in an assembly process. Compliance in the manipulation of an object is desirable because variations in the location of various components can exist, even in highly precise automated processes. As a result, some compliance is typically provided in a positioning mechanism to prevent damage to the components and the positioning mechanism itself.

There have been numerous compliance mechanisms described in the art for use with robotic applications. However, many of these mechanisms of the existing art have no repeatable centered position. Thus, the alignment of compliant and non-compliant parts when setting up a machine is very difficult. For other compliance mechanisms of the existing art, it is difficult to determine when to unlock the mechanism when picking or placing a part. Still other compliant mechanisms of the existing art use flexures or elastomers that undesirably require a deflection force proportional to the deflection distance.

While the existing compliance devices are functional, there remains a need for an improved compliance mechanism that overcomes these and other limitations of the prior art.

SUMMARY OF THE INVENTION

In accordance with preferred embodiments, an assembly device (compliance mechanism) is provided to position a control object, such as a disc/spacer stack about a spindle motor hub in a disc drive data storage device. The assembly device includes a frame and a socket fixed to the frame. A robotic arm supports an end effector which in turn grasps and releases the control device. A locking arm engages the robotic arm and moves between a locked position and an unlocked position.

Preferably, the locking arm uses a ball and socket arrangement to establish a reference position for the locking arm. The ball and socket keeps the end effector in a rigid, nominally centered position until the exact moment compliance is required. The locking arm remains locked as the robotic arm moves the end effector to the desired transfer position. As the end effector is moved to a desired placement position for the control object, the plunger engages an alignment feature which unlocks the locking arm, introducing a desired amount of compliance to facilitate final placement of the control object.

These and various other features as well as advantages which characterize the claimed invention will become apparent upon reading the following detailed description and upon reviewing the associated drawings.

BRIEF DESCRIPTION OF THE DRAWINGS

FIG. 6 is a cross-sectional schematic view of an assembly device in accordance with another preferred embodiment of the present invention, with the assembly device of FIG. 6 in a locked position.

FIG. 7 is a cross-sectional schematic view of the assembly device of FIG. 6 in an unlocked position.

DETAILED DESCRIPTION

Figure 1:
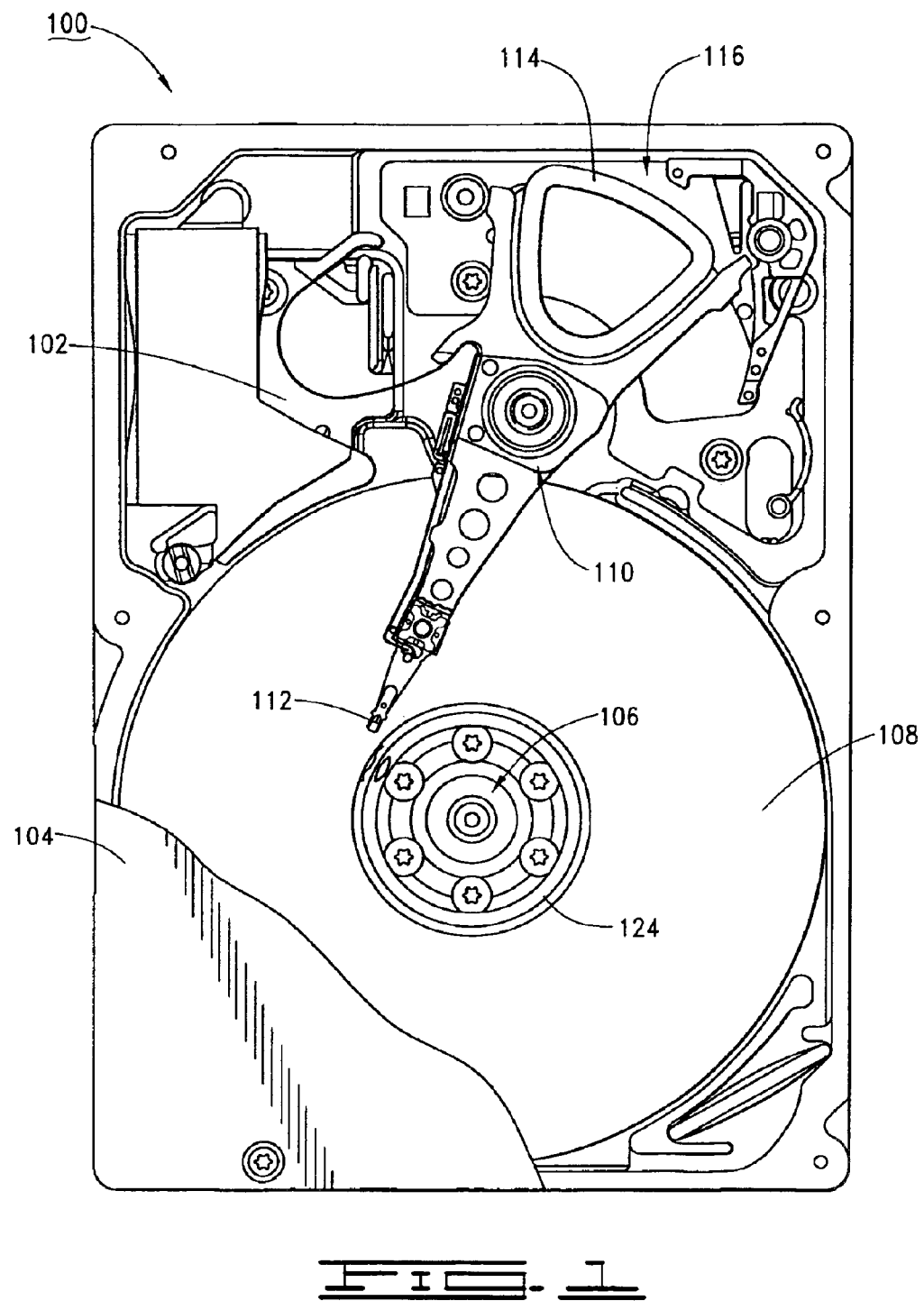
FIG. 1 is a plan view of a disc drive suited for use with preferred embodiments of the present invention.

To provide an exemplary environment in which preferred embodiments of the present invention can be advantageously practiced, FIG. 1 provides a top plan view of a disc drive 100 of the type used to store digital computer data. A base deck 102 and a top cover 104 (shown in partial cutaway) cooperate to form a sealed housing for the disc drive 100. A spindle motor is provided with a rotatable hub 106 to support and rotate a number of magnetic recording discs 108 at a constant, high speed. A rotary actuator assembly 110 supports a corresponding number of data transducing heads 112 adjacent recording surfaces of the discs 108. The actuator assembly 110 is rotated through application of current to a coil 114 of a voice coil motor (VCM) 116.

Figure 2:
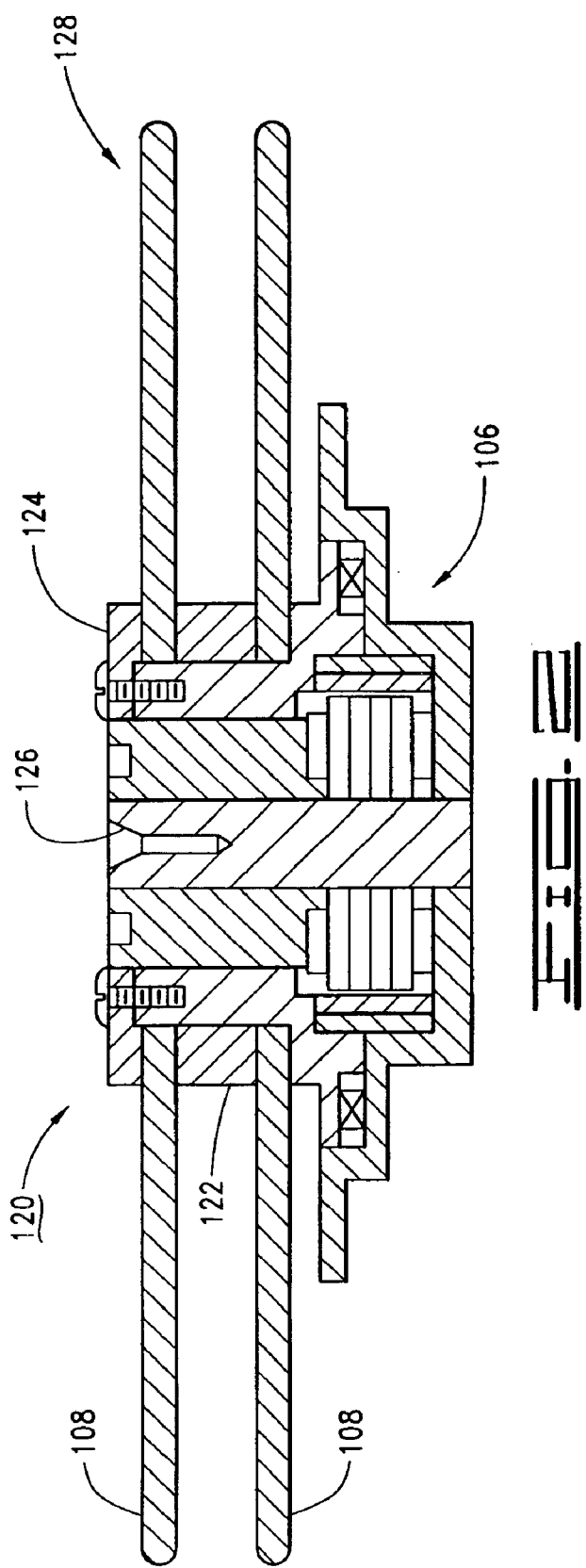
FIG. 2 is an elevational sectional view of a disc stack assembly of the disc drive of FIG. 1 constructed in accordance with a preferred embodiment of the invention.

FIG. 2 shows a cross-sectional schematic view of a disc stack assembly 120 of the disc drive 100. The disc stack assembly 120 is shown to include a pair of discs 108, a disc spacer 122 between the discs 108, the spindle motor hub 106, and a disc clamp 124 (also shown in FIG. 1). The spindle motor defines an outwardly opening alignment feature 126 for purposes of positive positioning during fabrication processes as described below. The discs 108 and spacer 122 are referred to herein as a disc/spacer stack 128. It will be understood that the configuration of the disc stack assembly 120 shown in FIG. 2 is for exemplary purposes only and is not limiting to the scope of the claimed invention.

Figure 3:
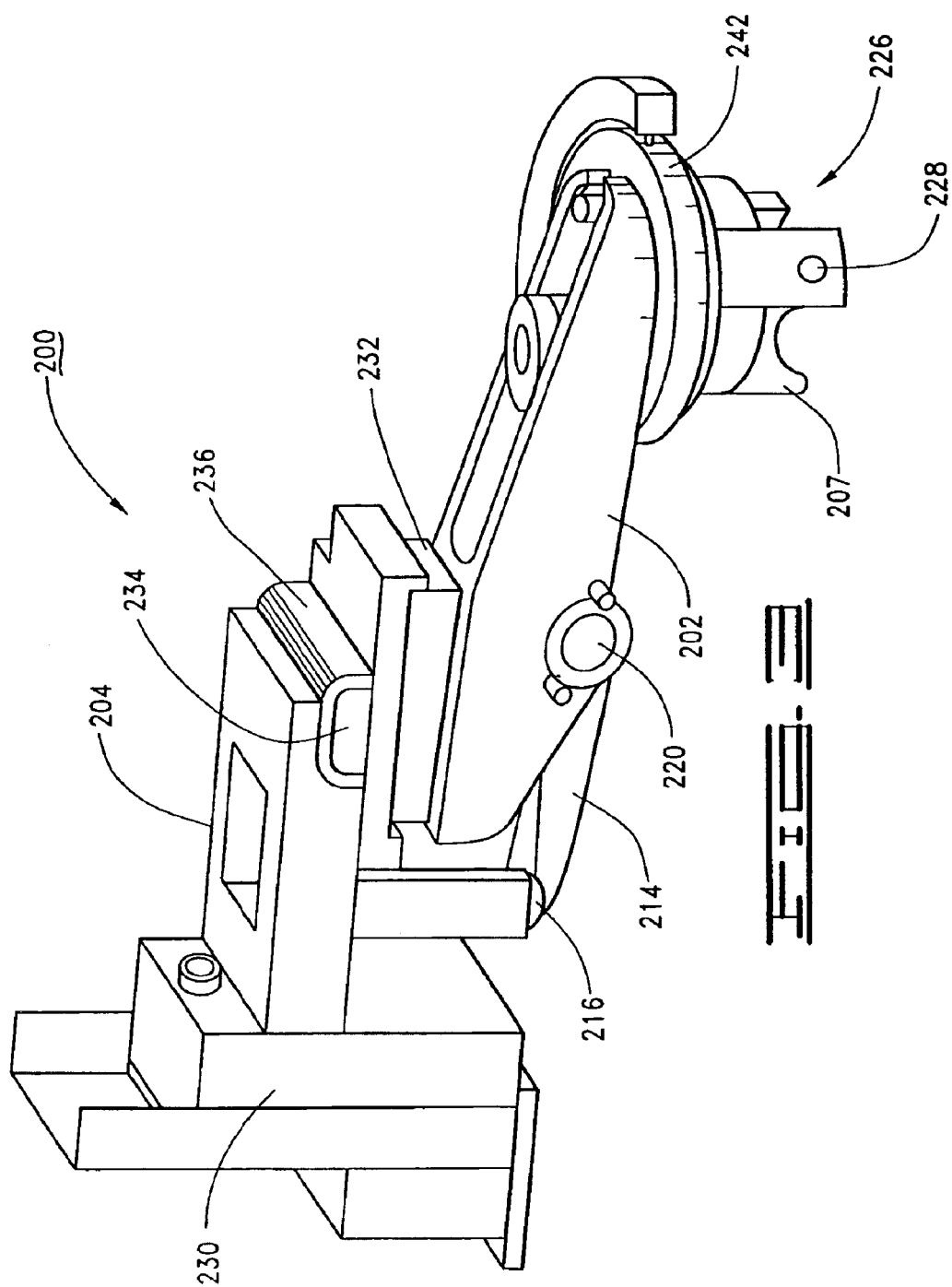
FIG. 3 is a perspective view of an assembly device in accordance with a preferred embodiment of the present invention, the assembly device used to construct the disc stack assembly of FIG. 2.
Figure 4:
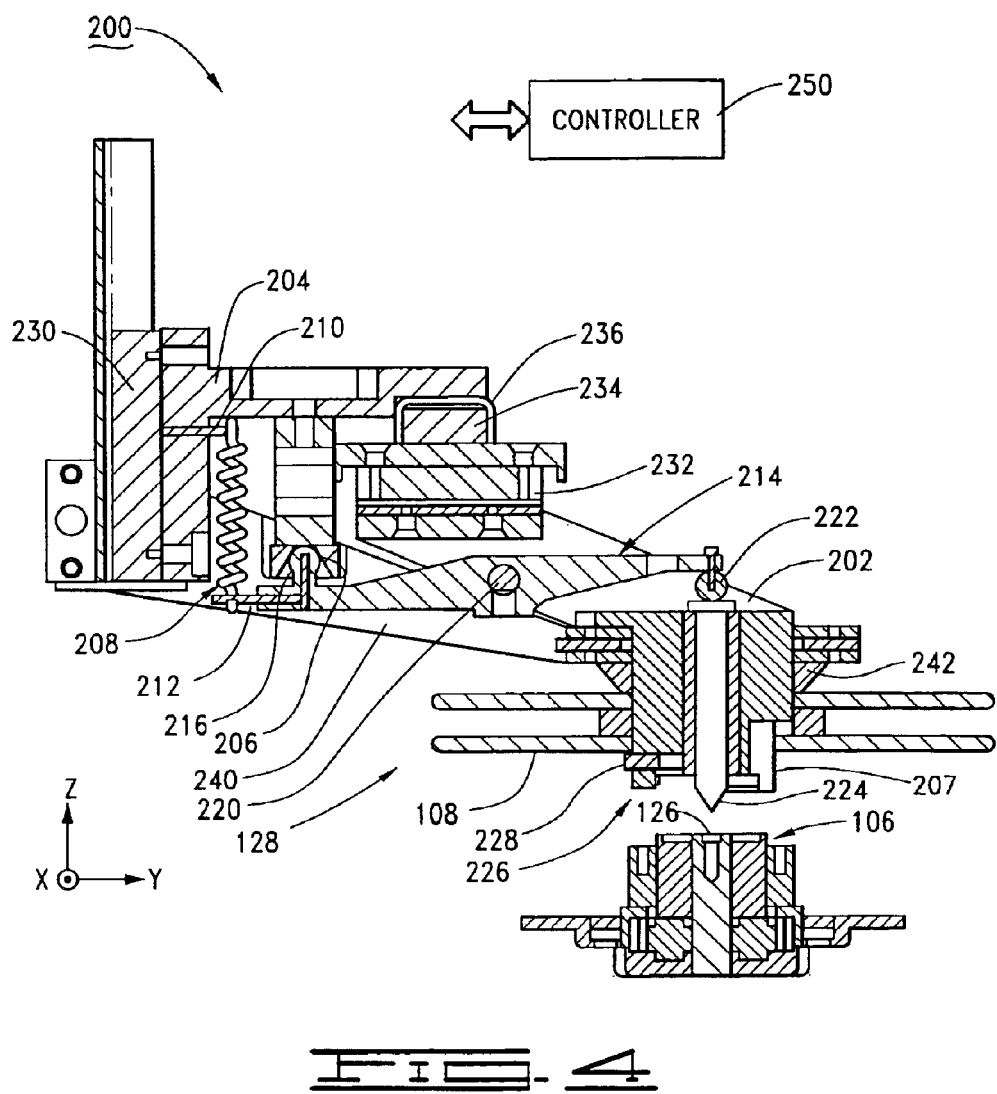
FIG. 4 is cross-sectional schematic view of the assembly device of FIG. 3, with the assembly device shown in a locked position.
Figure 5:
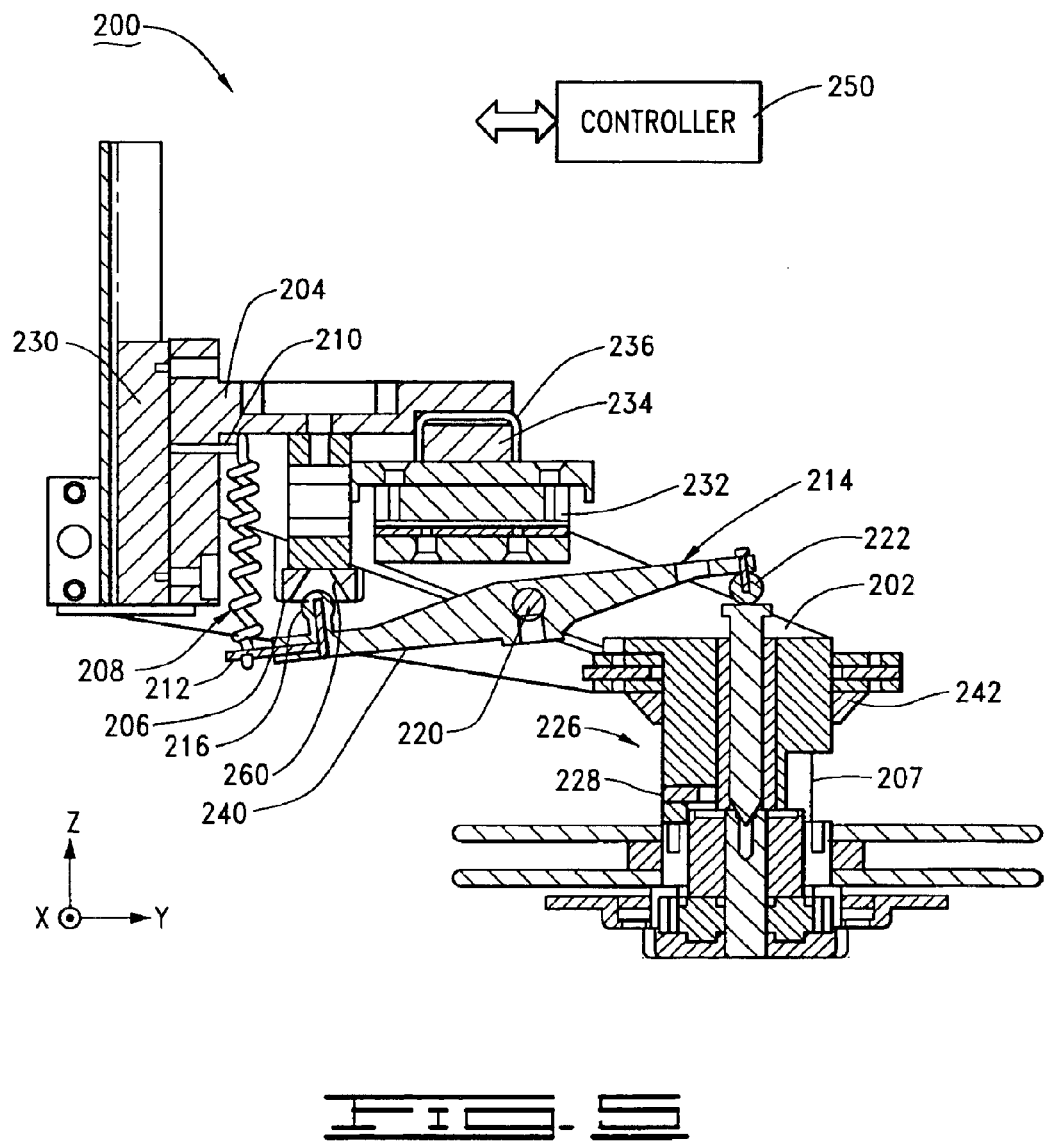
FIG. 5 is a cross-sectional schematic view of the assembly device of FIG. 3 in an unlocked position.

FIG. 3 provides a perspective view of an assembly device 200 configured to manipulate objects during assembly, such as the discs 108 and spacer 122 of FIG. 2. FIGS. 4 and 5 provide cross-sectional schematic views of the assembly device 200. FIG. 4 shows the assembly device 200 in a locked position and FIG. 5 shows the assembly device 200 in an unlocked position, as explained below.

The assembly device (or compliance mechanism) 200 includes a robotic arm (or stacker arm) 202 on which the disc/spacer stack 128 is formed. A frame 204 is attached to the robotic arm 202. A conical socket 206 is attached to the frame and a first end of a tension spring 208 is attached to a member 210 that is rigidly attached to the frame 204. A spring constant, or stiffness, of the spring 208 is chosen to fit the demands of a particular application.

A second end of the tension spring 208 is attached to a first end 212 of a locking arm 214 to bias a socket ball 216 in the socket 206. With the socket ball 216 biased in the socket 206, as shown in FIGS. 3 and 4, the locking arm 214 is in the locked position. The socket ball 216 is displaced from the socket 206 in FIG. 5 to illustrate the unlocked position. For purposes herein, the socket ball 216 is generally referred to as an engagement portion which establishes a reference position with respect to the frame (via socket 206). It will be noted that other configurations for the engagement portion can readily be used, such as a reversal of the location of the ball and socket as well as other contact surface shapes besides a spherical ball (such as a cone, etc.). It will further be noted that other locations for the engagement portion besides at the distal end of the locking arm 214 can be used, as desired.

A medial portion of the locking arm 214 is pivotally attached to a rod 220, which is in turn rigidly attached to the robotic arm 202. A ball contactor 222 is positioned at a second end of the locking arm 214. The ball contactor 222 pressingly engages a plunger 224. The plunger 224 assists the assembly device 200 in centering the disc/spacer stack 128 (FIG. 2) on the spindle motor hub 106 (FIG. 2). The plunger 224 extends through a center of an end effector 226.

The end effector 226 is located at an end of the robotic 202 arm and includes a three-pronged mandrel 207 (best viewed in FIG. 3) with an outer diameter slightly smaller than an inner diameter of the discs 108 and spacers 122. The disc/spacer stack 128 is formed on the end effector 226 one piece at a time and held in place by end effector balls 228. The end effector balls 228 are outwardly biased by springs (not separately shown) and thereby retractable so that the end effector can be passed through a disc 108 or spacer 122 by applying a sufficient downward force. After the end effector balls 228 pass through a disc 108 or spacer 122, the springs return the end effector balls 228 to a biased position to retain the discs 108 and spacers 122 on the end effector 226. This mechanism that has outwardly biased end effector balls 228 on the end effector 226 is referred to as a ball-and-plunger mechanism.

Still referring to FIGS. 3–5, the assembly device 200 is capable of being positioned at any point in space within a defined range of movement. The entire frame 204 is configured to be controllably raised and lowered in a z direction by a z axis elevator 230. In FIGS. 3–4, the z axis is vertical, the y axis is horizontal and the x axis is normal to the plane containing the z axis and the y axis. The robotic arm 202 is attached to a y slider 232, which slides in the y direction. The y slider 232 is attached to an x slider 234 and the robotic arm 202 moves in the x direction by the x slider 232 sliding in an x channel 236. The elevator 230 is powered by an electric or hydraulic motor (not separately shown) to raise and lower the end effector 226 to a desired elevation.

When the locking arm 214 is maintained in the unlocked position so that the socket ball 216 is displaced from the socket 206, the x and y sliders 234, 232 permit free movement of the end effector 226 along the respective x and y axes. This is referred to as a compliant mode. On the other hand, when the locking arm 214 is in the locked position so that the socket ball 216 is seated in the socket 206, the locking arm 214 retards movement of the end effector 226 along the x and y axes. This is referred to as the noncompliant mode.

It will be noted that as long as the ball 216 remains seated in the socket 206, the ball and socket combination establishes a fixed, repeatable reference point for the end effector 226 in the x-y plane. It has been observed that a user can grasp the end effector 226 and physically move the end of the robotic arm around in space, provided sufficient force is applied to overcome the bias of the spring 208 and dislocate the ball 216 from the socket 206. However, once the user releases the end effector 226, the spring reseats the ball 216 and the end effector 226 will return to the previous x-y reference position.

When the assembly device 200 has properly positioned the disc/spacer stack 128, an unload arm moves 240 downward with respect to the frame 204 and a push plate 242 engages the disc/spacer stack 128 to unload the disc/spacer stack 128 from the end effector 226 and to move the stack onto the spindle motor hub 106. The push plate 242 is rigidly attached to the unload arm 240.

A programmable controller 250 preferably directs the assembly device 200. In a typical application, a conveyor system (not shown) moves the disc drive 100 with the spindle motor hub 106 into close proximity with the assembly device 200. The conveyor system operates to position the disc drive 100 close to where the disc drive should be to receive the disc/spacer stack 128. Nevertheless, a small positioning error on the order of a few millimeters can typically exist in the final placement of the spindle motor hub 106.

The transfer of the disc/spacer stack from the end effector 226 to the spindle motor hub 106 begins by the controller 250 lowering the z slider 230 to bring the end effector 226 into alignment with the spindle motor hub 106. As the end effector 226 is lowered onto the hub, a first end of the plunger 224 engages the alignment feature 126 (in this case, a wall of the central aperture) and a second end of the plunger 224 engages the ball contactor 222.

This engagement unlocks the locking arm 214 by causing the socket ball 216 at the first end of the locking arm 214 to move away from a seated position in the socket 206, introducing compliance in the x-y plane to facilitate fine alignment of the end effector 226 with the spindle motor hub 106 and proper transfer of the disc/stack assembly 128 onto the hub. More particularly, the conical shape of the first end of the plunger 224 will cause the plunger to follow the chamfered wall of the alignment feature 126 and center the end effector 226 onto the spindle motor hub. The controller 250 then proceeds to direct the push plate 242 to advance the disc/stack assembly 128 onto the hub 106 (as shown in FIG. 4).

It is contemplated that the system tolerances will typically be such that the tip of the plunger 224 will fall within the radial extent of the alignment feature 126 in the spindle motor hub 106. However, in a preferred embodiment the system is further configured to detect gross misalignment of the end effector 226 and the spindle motor hub 106. If during such lowering the plunger 224 becomes misaligned with the alignment feature 126, a premature unlocking of the locking arm 214 will take place as the second end of the plunger 224 acts against the contactor ball 222 of the locking arm 214. This will result in a premature movement of the ball 216 out of its alignment position in the socket 206, which will be sensed by a socket sensor 260 in the socket 216. Since the controller 250 monitors the distance that the end effector 226 is lowered along the z axis, the controller 250 will note that such unlocking has occurred at too high an elevation. In such case the controller 250 will interrupt the transfer operation and employ any number of algorithms in a conventional manner to search and locate the precise alignment point to engage the hub, or provide a system error alarm to be serviced by personnel.

It will be noted that a wall of a central aperture in FIG. 2 serves as a convenient alignment feature 126 or the plunger 224. However, it will be readily understood that other configurations of alignment features in the spindle motor can readily be used, including features that project upwardly from the spindle motor hub, as desired. As noted above, the use of a conically shaped end on the plunger 224 advantageously aids in achieving the mating engagement between the end effector 226 and the work object.

Although the assembly device 200 has been described so far in relation to the placement operation of a disc/spacer stack 128 on a spindle motor hub 106, it is also useful in "pick" operations where the end effector 226 picks up the discs 108 and spacers 122. Whenever the end effector 226 picks up a disc 108 or spacer 122, the z slider 230 moves the robotic arm 202 and end effector 226 downwardly to pick the disc 108 or spacer 122. In inserting the end effector 226 inside the disc 108 or spacer 122, the end effector 226 encounters some mechanical resistance to the downward motion from the end effector balls 228. This upward mechanical resistance force is transmitted from the end effector 226 and through the plunger 224 to force the ball contactor 222 upward and unlock the locking arm 214. Once the end effector balls 228 have passed through the discs 108 or spacers 122, the locking arm 214 pivots back to the locked position.

FIGS. 6 and 7 illustrate an assembly device 300 (compliance mechanism) constructed in accordance with another preferred embodiment of the present invention. Generally, the assembly device 300 is constructed and operated in a manner similar to that of the assembly device 200 of FIGS. 3–5. One difference between the respective devices is the assembly device 300 uses a linear arrangement instead of a pivotal arrangement to move from a locked position (FIG. 6) to an unlocked position (FIG. 7).

The assembly device 300 includes an articulating robotic arm 302 mounted to a frame 304. The arm 302 supports an end effector 306 having a vacuum assisted configuration. The end effector 306 is shown supporting a single disc 108 for placement onto an associated spindle motor hub 106 of a spindle motor.

The end effector 306 is controllably raised and lowered along a vertical z axis through use of a z axis elevator 308. An x slider 310 facilitates movement of the end effector 306 along an x axis and a y slider 312 facilitates movement along a y axis.

A locking arm 314 is configured for linear movement along the z axis via z slider 316. A tension spring (not shown) behind the z slider 316 biases the locking arm 314 in the position shown in FIG. 6. A ball 318 at a first end of the locking arm 314 is normally seated in a ball socket 320. A contactor 322 at a second, opposing end of the locking arm 314 engages a plunger 324 which extends through the end effector 306.

As with the assembly device 200 of FIGS. 3–5, the assembly device 300 of FIGS. 6–7 uses the locking arm 314 with the ball and socket arrangement to substantially remove compliance along the x-y plane when the device is in the locked position (noncompliant mode). Engagement of the distal end of the plunger 324 with the alignment feature 126 in the spindle motor (as shown in FIG. 6) causes the ball 318 to be displaced from the socket 320, moving the locking arm 314 to the unlocked position (compliant mode) and introduces the necessary compliance to facilitate alignment of the end effector 306 with the spindle motor hub 106.

It will now be understood that the present invention is generally directed to a compliance mechanism (assembly device) for manipulating a control object (such as a disc/spacer stack 128). In accordance with preferred embodiments, an assembly device (such as 200, 300) includes a frame (such as 204, 304) which supports a robotic arm (such as 202, 302).

A locking arm (such as 214, 314) is moveable between a locked position and an unlocked position. The locking arm has an engagement portion (such as ball 216, 318) which is biased toward an alignment position (such as socket 206, 320) relative to the frame so that the locking arm is normally in a locked position. An end effector (such as 226, 306) is attached to the robotic arm and is configured to support the control object. A plunger (such as 224, 324) is coupled to the locking arm and configured to engage an alignment feature (such as 126) associated with a desired placement of the control object. The engagement portion maintains the end effector in a substantially noncompliant condition when the locking arm is in the locked position. Pressing engagement of the plunger against the alignment feature causes the locking arm to move to the unlocked position to introduce compliance into the end effector to allow freedom of movement of the end effector relative to the control object.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the compliance mechanism without departing from the spirit and scope of the present invention.

In addition, although the embodiments described herein are directed to an assembly device for assembling a disc drive, it will be appreciated by those skilled in the art that the assembly device can be used for other devices without departing from the spirit and scope of the claimed invention.

What is claimed is:

1. An assembly device comprising:

a frame supporting a robotic arm; and a locking arm affixed to the robotic arm, the locking arm maintained in a locked position by an engagement feature communicating with and constrained by a corresponding confinement feature, in which the engagement feature is affixed to a selected one of the frame and locking arm, and the confinement feature is provided by the remaining one of the frame and locking arm.

2. The assembly device of claim 1 further comprising an end effector supported by the robotic arm providing a movable plunger which contactingly engages the locking arm, wherein the movable plunger produces displacement of the engagement feature from its corresponding confinement feature to place the locking arm in an unlocked position causing an introduction of compliance in the end effector when the movable plunger contactingly aligns with an alignment feature associated with a desired displacement of the end effector, and wherein the locking arm comprises a first and second end with a medial portion disposed therebetween, in which the medial portion is pivotally affixed to the robotic arm, and wherein the engagement feature is a socket ball, and the corresponding confinement feature is a socket sized to accommodate the socket ball.

3. The assembly device of claim 2 wherein the end effector supports a control object, and in which the control object comprises a first object, wherein the alignment feature comprises a wall of an aperture of a work object, and wherein the first end of the plunger comprises a conical tip to align with the aperture for transfer of the first object from the end effector to the work object when the locking arm is in the unlocked position.

4. The assembly device of claim 2 further comprising an x slider attached to the frame that allows movement of the end effector in an x direction when the locking arm is in the unlocked position, wherein the locking arm substantially restricts movement of the end effector in the x direction when the locking arm is in the locked position.

5. The assembly device of claim 4 further comprising a y slider attached to the frame that allows movement of the end effector in a y direction normal to the x direction when the locking arm is in the unlocked position, wherein the locking arm substantially restricts movement of the end effector in the y direction when the locking arm is in the locked position.

6. The assembly device of claim 2 further comprising an unload arm to advance a control object secured by the end effector when the plunger is pressingly engaged against the alignment feature.

7. The assembly device of claim 6 wherein the control object comprises a disc stack.

8. The assembly device of claim 6 wherein the alignment feature comprises a wall of an aperture which extends into a work object.

9. The assembly device of claim 1 wherein the engagement feature of the locking arm comprises a first end of the locking arm, wherein the locking arm further comprises a medial portion and a second end, wherein the medial portion of the locking arm is affixed for linear movement relative to the robotic arm, and wherein the first end of the locking arm is configured to engage the frame in a ball and socket arrangement when the locking arm is in the locked position.

10. The assembly device of claim 1 further comprising a controller, wherein premature movement of the locking arm to the unlocked position causes the controller to interrupt placement of the control object.

11. A compliance mechanism comprising:
 a frame supporting a robotic arm that includes a locking arm pivotally attached to the robotic arm for movement of the locking arm between locked and an unlocked position;
 a socket affixed to a selected one of the frame and the locking arm;
 a socket ball affixed to the remaining one of the frame and the locking arm; and
 a plunger provided by an end effector attached to the robotic arm
 the plunger contactingly engaging the locking arm and configured to align with an alignment feature associated with a desired placement of the end effector, wherein the socket and the socket ball cooperate to maintain the locking arm in the locked position until the plunger engages the alignment feature, causing the introduction of compliance in the end effector sufficient to facilitate freedom of movement of the end effector.

12. The compliance mechanism of claim 11 further comprising a biasing member which biases the locking arm in the locked position.

13. The compliance mechanism of claim 11 wherein the locking arm pivots between the locked and unlocked position.

14. The compliance mechanism of claim 11 wherein the locking arm moves in a linear direction between the locked and unlocked position.

15. The compliance mechanism of claim 11 wherein the end effector supports a control object, and in which the alignment feature comprises a wall of an aperture and wherein the plunger comprises a conical tip which is moveable along the wall of the aperture to align the control object when the locking arm is in the unlocked position.

16. The compliance mechanism of claim 11 further comprising an x slider attached to the frame that allows movement of the end effector in an x direction when the locking arm is in the unlocked position, wherein the locking arm substantially restricts movement of the end effector in the x direction when the locking arm is in the locked position.

17. The compliance mechanism of claim 16 further comprising a y slider attached to the frame that allows movement of the end effector in a y direction normal to the x direction when the locking arm is in the unlocked position, wherein the locking arm substantially restricts movement of the end effector in the y direction when the locking arm is in the locked position.

18. The compliance mechanism of claim 11 wherein the end effector supports a control object, and in which the control object is a disc/spacer stack.

19. The compliance mechanism of claim 11 further comprising a controller to control the operation of the compliance mechanism.

20. The compliance mechanism of claim 11 further comprising a socket sensor to sense when the socket ball is displaced from the socket.

* * * * *